United States Patent [19]

Galgóczy et al.

[11] 3,828,515

[45] Aug. 13, 1974

[54] NON-SLIP, HIGH STRENGTH BOLTED JOINTS

[76] Inventors: Gábor Galgóczy, Benczur u. 3;
Zoltán Gyulai, Tapolcsanyi u. 8;
Tivadar Palágyi, Gyori u. 14, all of
Budapest; József Wagensommer,
Petofi u. 19, Biatorbagy, all of
Hungary

[22] Filed: May 21, 1971

[21] Appl. No.: 146,450

Related U.S. Application Data

[63] Continuation-in-part of Ser. No. 885,425, Dec. 16, 1969, abandoned.

[52] U.S. Cl. .................. 52/758 F, 29/432, 29/526, 403/388
[51] Int. Cl. ............................................. F16b 5/02
[58] Field of Search ........... 287/189.36 F, 189.36 C; 29/432, 521, 526, 459; 285/412, 294

[56] References Cited
UNITED STATES PATENTS 1,348,667   8/1920   Snyder ........................... 285/412 X
1,827,297  10/1931   Moore ............................. 287/109
2,329,653   9/1943   Rogoff ........................... 29/459 UX
3,279,972  10/1966   Thassy ............................ 161/53
3,325,195   6/1967   Margis ............................ 285/294
3,531,850  10/1970   Durand ........................... 29/526 X Primary Examiner—Jordan Franklin
Assistant Examiner—Wayne L. Shedd

[57] ABSTRACT

Improved non-slip structural joints between metal members held together by high strength bolts means which hold them in forcible face-to-face engagement, and method of forming such joints. In accordance with the invention strong shearing elements are partially embedded in at least one of the metal members and extend across the interface therebetween. The shearing elements may be separate from and embedded in both metal members, or may be parts of the metal members and embedded in the other of the metal members.

8 Claims, 8 Drawing Figures

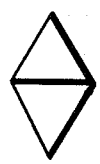
Fig. 1a    Fig. 1c
Fig. 1b    Fig. 1d
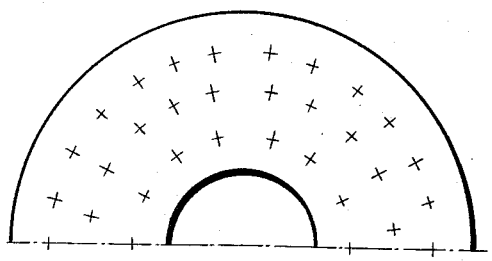
Fig. 2
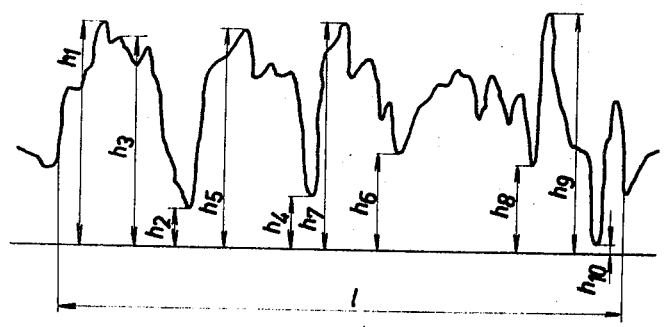
Fig. 3

NON-SLIP, HIGH STRENGTH BOLTED JOINTS

This is a continuation-in-part application of our parent application Ser. No. 885,425 filed Dec. 16, 1969, now abandoned.

This invention relates to non-slip high strength bolted joints (also referred to as high strength friction grip bolted joints in structural metalwork; designated friction-type joints in the following) having an increased loading capacity for metal constructions. The invention also relates the methods for the manufacture of such friction-type joints.

Hitherto used friction-type joints functioned by bringing together with great force the elements to be joined by the tightening of the high strength bolts, the transmission of external force (tension or pressure) at right angles to the bolt axis taking place via the thus increased friction between the contact surfaces. The advantages of this method of joining which in recent times have increasingly supplanted the conventional methods of joining metal structures, such as riveting and welding, are the saving in material and a greater fatigue strength, as well as a simpler and more economic assembly, compared with the conventional methods of joining.

Any further development of this method of joining metal structures, however, is hindered by the following reasons:

1. The design procedure of the hitherto used friction-type joints has not yet been fully cleared. In these joints the net section tension-stresses are namely no longer proportionally related to the external load but, instead, as a result of slide and flow processes, show a characteristic polygonal system having varying distribution. The presently valid dimensioning via the allowable $f_t$ on net section therefore leads to different safety against fracture and loading capacity which, even with a constant factor of safery against slip $\nu_s$ and with the same allowable external load $F_t$, can vary between $\nu = 1.50$ and 2.25 (K. Kloeppel-T. Seeger: "Sicherheit und Bemessung von HV-Verbindungen aus St 37 und St 52 nach Versuchen unter Dauerbelastung und ruhender Belastung," publications of the Institute for Statics and Steel Constructions, of Darmstadt Technical University, 1965).

2. The allowable "tolerance" between bolt and the edge of the bolt hole of only one-sixteenth inches makes assembly on site very difficult.

3. The contact surfaces of the friction-type joints hitherto used prepared by hitherto conventional processes, such as flame-blowing and sand-blasting, must be protected from external influences (corrosion, impurities etc.) prior to bolting, since these influences can considerably lower the slip factor value $\mu$ (the quotient of the slip load and the bolt tension).

4. Flame-blowing, the hitherto only possible on-site preparation —according to our own test results— causes in some cases a structural change in the contact surfaces. With flame-blowing, the temperature leads namely in places to the decomposition of perlite or to the recrystallisation of ferrite. The residual stresses between the various crystals, resulting from the partial transformation of the crystals, cause warpings which in practice frequently occur with the flame-blowing of larger and thinner plates as a result of which a subsequent costly levelling is necessary.

5. In the friction-type joints hitherto used the transmission of force by friction only takes place in the immediate vicinity of the bolts since the bolt tension is transmitted along a cone having a relatively small centre angle to the contact surface and the clamping action thus becomes effective only in the immediate vicinity of the bolt holes.

6. The pronounced clamping action in the hitherto used friction-type joints also at this joining method prevents the free sliding of the plate ends, and hereby the loading of the slide surfaces, disposed one behind the other in the direction of the force, is also here variable. Even under the same tightening of the bolts, the contact surface which is first in the direction of the force, starts to slide. The distribution of stresses is in accordance with the law of the hyperbolic cosine line (catenary curve). If the width of the plate is kept unchanged, a change in the thickness of the plate producing a construction of equal strength, is practically impossible. It is also impossible to calculate the friction-type joints —in analogy with the most recent riveting calculations— in the so-called state 3, in which the fasteners and the plate are considered to be worked in the plastic state.

7. The loading capacity of the hitherto used friction-type joints varies proportionally to the possible uncertainties of the bolt tension, such as creeping of the bolts and the inaccuracies of the tightening (due to reading errors, setting errors, temperature differences, i.e., the quotient of the torque applied and the product of the bolt tension and nominal diameter of the bolt, etc.). The bolt tension is at present one of the two basic factors for the dimensioning of the friction-type joints.

8. The large scatter of slip factor $\mu$ obtained with the hitherto used surface preparation techniques resulted the same scatter in the loading capacity of the joints. The slip factor when dimensioning the friction-type joints. The scatter in the slip factor and hereby the ladong capacity are illustrated in the hitherto used friction-type joints as follows:

According to the German specification at present valid ("Vorlaeufige Richtlinien fuer Berechnung, Ausfuehrung und bauliche Durchbildung von gleitfesten Schraubenverbindungen —HV-Verbindungen— fuer staehleren Ingenieur- und Hochbauten, Bruecken und Krane" 2nd edition; Stahlbau-Verlag GmbH., Cologne, 1963), which have also been accepted by other countries, the amount of the slip factor to be taken into account is: with steels equivalent to St 33 and St 37 (of an ultimate strength of 33 and 37 kp/mm² ≈ 52.6 ksi):$\mu = 0.45$, with steels equivalent to St 52 (of an ultimate strength of 52 kp/mm² ≈ 74 ksi): $\mu = 0.60$. These values are obtainable according to the above-mentioned specifications because e.g., the German one accurately indicates flame-blowing and sand-blasting techniques for the preparation of the contact surfaces of structural elements.

Accurate adherence to the above preparation techniques according to the hitherto valid specifications, yielded proximate the same values at both methods, with St 37:$\mu = 0.30$ to 0.76 and with St.52:$\mu = 0.56$ to 0.85 (O. Steinhardt-K. Moehler: "Versuche zur Anwendung vorgespannter Schrauben im Stahlbau" Ist and IInd parts; Stahlbau-Verlag GmbH., Cologne; 1954, 1959, also our own experiments).

The results of these laboratory tests also show a great scatter of the values obtained with the hitherto applied techniques, which, in view of possible extreme values, over and above the accepted safety, lead e.g., in steels St 37 to an underdimensioning of the constructions of $100 - (0.30/0.45) \, 100 \approx (-) \, 33$ per cent or to an overdimensioning of $(0.76/0.45) \, 100 \approx (+) \, 69$ per cent, and with steels St 52, calculated in precisely the same way, to an underdimensioning by about $(-) \, 7$ per cent or an overdimensioning by about $(+) \, 42$ per cent.

Similarly, instead of the minimum slip factor $\mu = 0.35$, specified for friction-type joints with untreated contact surfaces and made from steels having a specified yield point of about 33 ksi at 23.20 kp/mm² in the respective US-specifications ("Specifications for Structural Joints Using ASTM A325 or A490 Bolts"; Research Council on Riveted and Bolted Structural Joints of the Engineering Foundation, 1964), slip factors between $\mu = 0.18$ to $0.51$ are obtained (O. Steinhardt-K. Moehler: "Versuche zur Anwendung vorgespannter Schrauben im Stahlbau" Ist and IInd parts; Stahlbau-Verlag GmbH., Cologne; 1954, 1959, also our own experiments), indicating that these constructions may be underdimensioned by about $(-) \, 49$ per cent or overdimensioned by about $(-) \, 46$ per cent.

It is the objective of the invention to overcome the above-stated disadvantages and thus make possible primarily a reduction in the scatter of the actual safety of friction-type joints in metal constructions and thus to enable a more precise adjustment of the loading capacity thereof, and to bring in a simple and economical manner an increase in the loading capacity of these joints.

The invention is based on the finding that the loading capacity of the friction-type joints, differing from previous theory (lectures relating thereto during the VIIth Congress of the "Association Internationale des Ponts et Charpentes," Rio de Janeiro, 1964), is determined in practice not by the friction between the contact surfaces but mainly by the shearing of the projecting portions of the contact surfaces pressed against one another by the bolt tension, i.e., it depends on the roughness and strength of these surfaces.

On the basis of this finding it becomes possible so to increase the loading capacity of the friction-type joint by means of shearing and to determine it so unequivocally and with slight scatter that on or between the contact surfaces suitable elements will be provided, and that the external forces will be transmitted at right angles to the bolt axis by means of shearing strength of the shear areas of these elements.

The non-slip joint according to the invention is thus not the "friction-type joint" of the prior art but a "non-slip shear joint."

The invention concerns non-slip high strength bolted joints having an increased loading capacity for metal constructions, in which on the contact aurfaces of the joint or between the contact surfaces, elements designated as shearing elements hereinafter, manufactured from the material of and structurally related to the material of the contact surfaces or elements which are structurally different from this material, are disposed in a maximum size which corresponds to the thickness of the thinnest element used in the joints and the strength of which is higher than that of the base material, where the minimum dimension of those shearing elements which are structurally related to the contact surface used in the joint —expressed with the aid of one of the two "geometrical parameters" of the roughness of the surface obtained— corresponds to a value of 0.004 inches of the "height $R_z = R_{max}$ of irregularities" measures on a "sampling length" $l = 0.1$ inch (according to "International Organization for Standardization," ref. No. ISO/R 468–1966–E), whilst the average particle size of shearing elements which are structurally different from the contact surfaces, exceeds the minimum value of 0.02 inches.

The shearing elements of the non-slip joint according to the invention can be disposed to one or to both contact surfaces in various ways thus e.g., in the granular state or —if the contact surfaces are not horizontal— from a suspension which contains a suitable binding agent, by blowing or coating, or theu can be manufactured from the material itself of the surfaces.

The shearing elements can have a shear area determined beforehand by dimensioning, or the can be elements disposed to the contact surfaces of manufactured from their material itself, the exact size of the shear area of which is not known. In the first case reference is made to "measured shear joints" and in the second case to "shear joints of an increased loading capacity."

A) In the case of the "measured shear joints," the shear area and thus the loading capacity can unambiguously be determined by the number of shearing elements necessary when they are introduced.

The shearing elements can be pressed into the contact surfaces either by compression of the elements to be joined by means of separate devices (e.g., by means of high strength bolts independent of the joint, hydraulically or the like), or by the clamping force which results from the thightening of the high strength bolts remaining in the joint, to such an extent that the contact surfaces come into contact. The transmission of force is thus effected by the shear areas of the shearing elements disposed in the contact surfaces.

It has proved to be highly advantageous to use the shearing elements secured in a foil or in a thin plate. It is thus possible to choose the orientation and the measured formation of the shear areas (the specific density per surface unit) in accordance with the various transmissible forces, e.g., the various bolt diameters. The seatings corresponding to the shape and distrubution of the shearing elements can also be produced by a correspondingly shaped die pressed into the contact surface.

The steel or plastic foil or plate, which contains the shearing elements in a distribution corresponding to the transmissible force is placed between the contact surfaces during the assembly of the joint, then cut out close to the holes of the mounting bolts or close to the holes of the final high strength bolts prior to the insertion thereof, and finally, after tightening the bolts, the excess portions of the foil or plate at the edges of the joint are cut off. It is also very advantageous to use special washers of a thickness of about 0.004 to 0.02 inches, which are manufactured for each bolt diameter and which contain secured therein and shearing elements in the necessary number and shape (e.g., shearing elements which can be pressed into the contact surfaces with the bolt tension of the corresponding bolt).

The shape of the shearing elements used according to the invention by blowing, coating or depositing, cubic shearing elements are most advantageous. When applying them by means of a foil, plate or special washer, shearing elements are most preferred which have the shape of double cones or double pyramids superimposed along their bases, and if desired, with cylinders or prisms inserted therebetween, which are secured with such an orientation in the foil, plate or washer that their axes extend at right angles to the plane of the latter.

In the drawing:

FIG. 1 a shows a double-pyramidal shearing elements in side view and FIG. 1 b shows the plane view thereof; FIG. 1 c shows a double -conical shearing element in side view and FIG. 1 d shows the plane view thereof.

FIG. 2 shows a distribution of shearing elements which are to be accommodated according to the hereafter example in a circular surface effectively pressed by the bolt tension of the M24 1 inch high strength bolt;

FIG. 3 shows a section through an e.g., "punched" contact surface on an enlarged scale;

According to a further advantageous method of application, the shearing elements of e.g., a conical or pyramidal shape are applied galvanically to the contact surfaces of the joint or to a plate inserted between these surfaces.

Figure 4A:
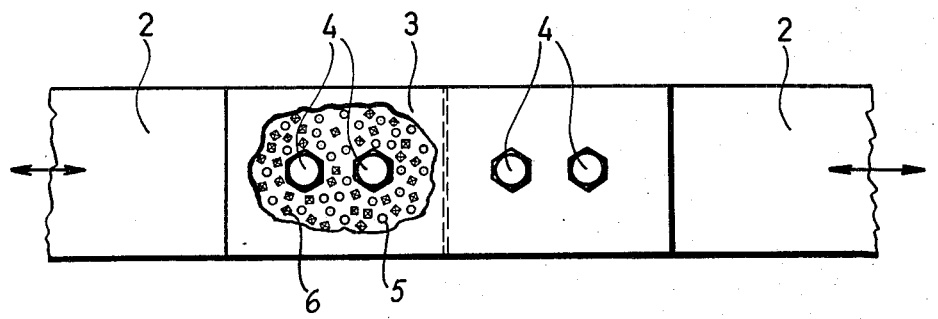
FIG. 4a is a view in plane of a high-strength structural friction-grip bolted joint in accordance with the invention.
Figure 4B:
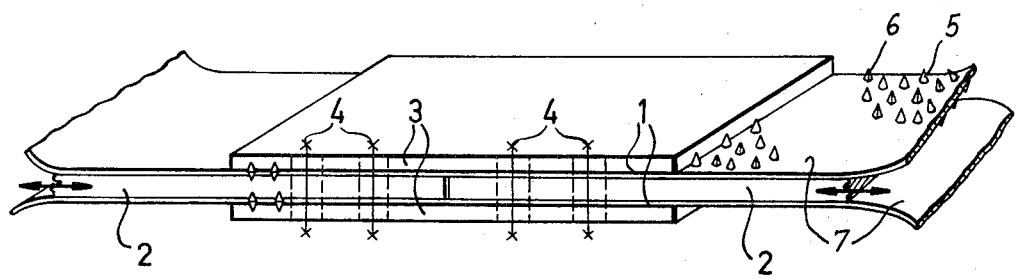
FIG. 4b is a view in elevation of the joint of FIG. 4a with the bolts thereof being shown diagrammatically.

FIGS. 4a and 4b illustrate a high-strength structural friction-grip bolted joint. Two plates 2 are connected together by outer cross-pieces 3 which are pulled into tight engagement with the opposite surfaces 1 of the plates 2 by high-strength bolts 4. The engaging surfaces 1 of plates 2 and the inner surfaces of the cross-pieces 3 have friction-grip surfaces in accordance with the present invention. Hard, double cone-shaped particles 5 and the alternative hard double pyramid-shaped particles 6, both shown greatly enlarged, project through thin plates 7 and are embedded in both plates 2 and 3.

This method of applying the non-slip joint according to the invention will be explained in more detail with reference to the following example.

EXAMPLE:

In a friction-type joint from St 37 steel, the allowable transmissible force $F$ (tension or pressure) at right angles to the bolt axis of e.g., an M24 bolt with an e.g., flame-blowed friction surface, results form the bolt tension $F_b$, the slip factor $\mu$ and the factor of safety against slip of e.g., $\nu_s = 1.6$ (from principal load $H$, in bridges and cranes) according to German specification valid at present:

allowable $F = (F_s/\nu_s) = (F_b\mu/\nu_s = (23.9) (0.45)/1.6$
$= 6.72.\text{MP} \approx 14.82.\text{kips}$ With a similar non-slip joint constructed according to the invention, using shearing elements from an alloyed steel hardened to $HR_c = 60$ kp/mm$^2$ = about 86.3 ksi), each with a shear area of $A = 7.07$ mm$^2 \approx 0.01$ inch$^2$ and with a double-conical shape ($D = 3$ mm $\approx 0.12$ inches), with a vertex angle of 60° (FIGS. 1c, 1d) of which, on the basis of our tests, the bolt tension of the M24 $\approx$ 1 inch high strength bolt can press seventeen pieces onto the contact surfaces, the transmissible force —calculated in the shearing elements with an allowable shearing stress of $f_t = $ A60 kp/mm$^2 \approx$ 85,3 ksi— is as follows: allowable $F = $ allowable $f_t$ 17 A $= 60 \times 17 \times 7.07 = 7.21$ Mp $\approx 15.90$ kips, where $HR_c = $ Rockwell hardness (C scale); D=base diameter; M24 = metric thread with nominal bolt size in mm; and the allowable external tensile or compressive force perpendicular to the bolt axis equals the allowable shearing stress $F_t$ multiplied by the number of applied shearing elements and with the shear area A.

Since according to our experience the size of the surface effectively pressed by the bolt rension of an M 24 bolt is about 60 cm$^2 \approx 9.3$ inches$^2$ (circle with a diameter of 87 mm $\approx 3.43$ inches) and in this surface (less the bolt hole with a diameter of 25 mm $\approx 0.98$ inches), can be placed a maximum of 60 pieces of mentioned shearing elements (FIG. 2), if these shearing elements are pressed into the contact surface with a separate device, the transmissible force of the non-slip joint according to the invention and satisfying the above conditions, is at most as follows:

allowable $F = $ allowable $f_t$ 60 A $= 60 \times 60 \times 7.07 = $
$= 25.45$ Mp $\approx 56.56$ kips.

It is clearly apparent form the above example that the use of the non-slip joint according to the invention represents an approximately 3.75-fold increase of the loading capacity compared with that of the hitherto used non-slip friction-type joints. The variation and safety of the load values is the same in the non-slip joints according to the invention as in the other structural members. Non-slip joints with the same loading capacity as that of the base material can thus easily be manufactured.

B. In the case of the "shear joints of an increased loading capacity" there are arranged on the contact surfaces shearing elements applied thereto or shearing elements made from the material thereof itself.

So-called "punching" was found to be very advantageous, in which the loading capacity of the friction-type joints was increased by making such shearing elements form the material of the contact surfaces of the elements to be joined, preferably mechanically e.g., by means of a suitable scority-pistol, which are structurally related to the contact surfaces, and the strength of which is greater than that of the base material, whereby a minimum surface roughness —expressed by means of one of the two "geometrical parameters" of the roughness of the surface obtained— of 0.004 inches is produced by the value of the "height $R_z = R_{max}$ of irregularities" (according to ISO, ref. No. 468–1966–E) measured on a "sampling length" $l = 0.1$ inch.

If the actual roughness of this surface obtained according to the invention is characterised by the value —measured on a "sampling length" (sampling length means the length of the effective profile selected for the evaluation of the surface roughness, without taking into account other types of irregularities.) $l = 0.1$ inch— of $R_z = R_{max} \geqq 0.004$ inches of the "the point height $R_z = R_{max}$ of irregularities" (FIG. 3) —i.e., by one of the two "geometrical parameters" of roughness—, the average distance between the five highest peaks $h_1$, $h_3$, $h_5$, $h_7$, $h_9$, and the five deepest valleys $h_2$, $h_4$, $h_6$, $h_8$, $h_{10}$, measured from a line parallel to the "mean line" and not crossing the profile within the "sampling length" $l = 0.1$ inch, have a value of at least 0.004 inches; the above mentioned value can be expressed by the following unbalanced equation: $R_z = $ $$R_{max} = [(h_1 + h_3 + \ldots + h_9) - (h_2 + h_4 + \ldots + h_{10})/5]$$
$$\geq 0.004 \text{ ins.}$$

The "punched" contact surfaces of the non-slip joints according to the invention were compared with the surfaces prepared according to the techniques hitherto used, on the one hand by comparison of the "height of irregularities" $R_z$ ascertained from the profilograms. The profilograms were dotted on the "sampling length" $l = 0.03$ and $l = 0.1$ inches. On the other hand the "arithmetical mean deviations $R_a$ from the mean line of the profile" measured with a profilometer of the "sampling length" $l = 0.03$ inches over a "traversing length" of $L = $ about 0.4 inches were compared. For both values an at least 2.5-fold increase or an average increase of one order of magnitude could be found in the "punching" according to the invention as compared with the values obtainable with the methods at present used. It thus clearly follows that shearing plays the decisive role in the loading capacity of the "punched" non-slip joints constructed according to the invention.

"Punching" makes possible an increase of the loading capacity of friction-type joints in metal constructions e.g., with steel equivalent to St 33 and St 37 by at least 30 per cent, on average 50 per cent and with steels equivalent to St 52 by at least 8 percent, on average 12 per cent, and a reduction of the number of the expensive bolts in the same proportion, by means of shearing instead of friction, —(as compared to the joints dimensioned according to the German prescription valid at present which designes in steels St 33 and St 37 with a slip factor of $\mu = 0.45$ ans in steel St 52 with a slip factor of $\mu = 0.60$). At the same time it also becomes possible to considerably reduce the loading capacity variation which in the hitherto used preparation methods results from an approximately ±50 per cent scatter in the slip factor; furthermore the possibility of underdimensioning and of unjustified overdimensioning are avoided in spite of the increased slip factor.

The following advantages of the non-slip joints according to the invention for metal constructions may be mentioned in addition to the elimination of the above-mentioned disadvantages in hitherto used friction-type joints:

a. The use of the joint according to the invention does not require skilled workers and is simpler and cheaper than that for the preparation of the contact surfaces of the friction-type joints of the hitherto used flame-blowing or sand-blasting processes because it requires simpler working tools and working conditions. The expensive sand-blasting apparatus or the cumbersome welding unit which is indispensable in the flame-blowing process here become unnecessary and in their place may be only an equipment for pressing the shearing elements into the contact surfaces, e.g., a hydraulic centre and a special hydraulic tool necessary, or an equipment necessary for the mechanical treatment of the surfaces, e.g., a compressor of small capacity and a special tool for compressed air.

b. The requirements in time and material of the solution according to the invention are less than that of hitherto used techniques of surface preparation. Thus e.g., "punching" requires only about 20 per cent of the time of the flame-blowing process and material requirements are insignificant.

c. The use of the method according to the invention contains almost no possibilities of subjective errors and its correct performance can easily be controlled. As compared with the complicated obligations of the methods hitherto used (with flame-blowing: feeding speed, nozzle distance, excess of and pressure of oxygen, etc.; with sand-blasting: quality of the sand, its particle size, nozzle distance, etc.), a satisfactory performance of the method (of the invention) can be ascertained merely by visual inspection.

Although the invention is illustrated and described with reference to a plurality of preferred embodiments thereof, it is to be expressly understood that it is in no way limited to the disclosure of such a plurality of embodiments, but is capable of numerous modifications with the scope of the appended claims.

What we claim is:

1. In a non-slip, high strength, bolted joint having at least a pair of members with confronting contact surfaces pressed together by at least one bolt, said contact surfaces having an average roughness and consisting of a base material, a numerous plurality of shearing elements being disposed on at least one of said contact surfaces, the strength and hardness of said shearing elements exceeding the strength and hardness of said base material, the minimum dimension of said shearing elements being at least equal to 0.004 inch and the average distance between the greatest height and lowest depth of the protuberances and recesses of the said roughness of the contact surfaces along a 0.1 inch sampling length on said contacting surfaces being at least equal to 0.004 inch, at least a major portion of said plurality of shearing elements extending across the interface of said confronting contact surfaces.

2. A non-slip high strength bolted joint according to claim 1 comprising a washer disposed between said contacting surfaces, the shearing elements being disposed upon the washer and having apices pointing in opposite directions and embedded in the respective confronting contact surfaces.

3. Non-slip joints according to claim 2, wherein the shearing elements are applied to the contact surface by means of a washer and are in the shape of double cones superimposed along their bases and have cylinders inserted therebetween.

4. Non-slip joints according to claim 2, characterised in that cubic shearing elements are provided on the contact surfaces.

5. Non-slip joints according to claim 2, wherein the shearing elements are applied to the contact surface by means of a washer and are in the shape of double pyramids superimposed along their bases and have prisms inserted therebetween.

6. A non-slip high strength bolted joint according to claim 2, comprising a foil disposed about the bolt and between the contacting surfaces, the shearing elements being disposed upon the foil and having apices pointing in opposite directions and embedded in the respective confronting contacting surfaces.

7. Non-slip joints according to claim 6, wherein the shearing elements applied to the contact surface by means of a foil are in the shape of double cones superimposed along their bases and have cylinders inserted therebetween.

8. Non-slip joints according to claim 6, wherein the shearing elements applied to the contact surface by means of a foil are in the shape of double pyramids superimposed along their bases and have prisms inserted therebetween.

* * * * *